US012160045B2

(12) United States Patent
Li et al.

(10) Patent No.: US 12,160,045 B2
(45) Date of Patent: Dec. 3, 2024

(54) RADIATOR ASSEMBLY FOR BASE STATION ANTENNA AND BASE STATION ANTENNA

(71) Applicant: Outdoor Wireless Networks LLC, Claremont, NC (US)

(72) Inventors: YueMin Li, Suzhou (CN); Long Shan, Suzhou (CN); Junfeng Yu, Suzhou (CN); Yabing Liu, Suzhou (CN); GuoLong Xu, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

(21) Appl. No.: 17/667,897

(22) Filed: Feb. 9, 2022

(65) Prior Publication Data

US 2022/0271443 A1 Aug. 25, 2022

Related U.S. Application Data

(63) Continuation of application No. 16/671,529, filed on Nov. 1, 2019, now Pat. No. 11,283,194.

(30) Foreign Application Priority Data

Dec. 10, 2018 (CN) ........................ 201811500081.6

(51) Int. Cl.
*H01Q 21/26* (2006.01)
*H01Q 1/24* (2006.01)
(Continued)

(52) U.S. Cl.
CPC ............. *H01Q 21/26* (2013.01); *H01Q 1/246* (2013.01); *H01Q 1/42* (2013.01); *H01Q 5/42* (2015.01);
(Continued)

(58) Field of Classification Search
CPC ................ H01Q 21/28; H01Q 21/062; H01Q 21/0006; H01Q 15/14; H01Q 1/42;
(Continued)

(56) References Cited

U.S. PATENT DOCUMENTS 6,067,053 A 5/2000 Runyon et al.
8,570,233 B2 * 10/2013 Lindmark ........... H01Q 19/106 343/834
(Continued)

FOREIGN PATENT DOCUMENTS

CN 1107995 C 5/2003
CN 101330163 A 12/2008
(Continued)

OTHER PUBLICATIONS

Notification of Transmittal of the International Search report and the Written Opinion of the International Searching Authority, or the Declaration, corresponding to International Application No. PCT/US2019/059350, mailing date Jul. 2, 2020, 19 pages.

*Primary Examiner* — Graham P Smith
(74) *Attorney, Agent, or Firm* — Myers Bigel, P.A.

(57) ABSTRACT

A radiator assembly for a base station antenna includes two dipoles arranged in a cross-over manner, each dipole including two dipole arms, and two feeding lines, each feeding line being associated with a respective one of the dipoles. Each dipole arm is integrally formed of sheet metal, and includes a radiating surface and a leg projecting from the radiating surface at an angle with the radiating surface, where the leg is electrically grounded.

20 Claims, 8 Drawing Sheets

(51) Int. Cl.

| | |
|---|---|
| ***H01Q 1/42*** | (2006.01) |
| ***H01Q 5/42*** | (2015.01) |
| ***H01Q 5/48*** | (2015.01) |
| ***H01Q 15/14*** | (2006.01) |
| ***H01Q 21/00*** | (2006.01) |
| ***H01Q 21/06*** | (2006.01) |
| ***H01Q 21/28*** | (2006.01) |

(52) U.S. Cl.
CPC ............... *H01Q 5/48* (2015.01); *H01Q 15/14* (2013.01); *H01Q 21/0006* (2013.01); *H01Q 21/062* (2013.01); *H01Q 21/28* (2013.01)

(58) Field of Classification Search
CPC ............ H01Q 1/246; H01Q 5/48; H01Q 5/42; H01Q 21/26
See application file for complete search history.

(56) References Cited

U.S. PATENT DOCUMENTS

| | | | |
|---|---|---|---|
| 2005/0057417 | A1 | 3/2005 | Teillet et al. |
| 2007/0046558 | A1* | 3/2007 | Tillery .................. H01Q 1/246 343/797 |
| 2007/0069970 | A1 | 3/2007 | Argaman et al. |
| 2007/0241983 | A1 | 10/2007 | Cao et al. |
| 2010/0171675 | A1 | 7/2010 | Borja et al. |
| 2012/0075155 | A1 | 3/2012 | Lindmark et al. |
| 2014/0327591 | A1 | 11/2014 | Kokkinos |
| 2015/0070234 | A1 | 3/2015 | Jones |
| 2015/0202004 | A1 | 7/2015 | Bonn et al. |
| 2015/0255882 | A1 | 9/2015 | Segador et al. |
| 2016/0275322 | A1 | 9/2016 | Carrender |
| 2017/0085009 | A1 | 3/2017 | Watson |
| 2018/0323513 | A1 | 11/2018 | Varnoosfaderani et al. |
| 2018/0337462 | A1 | 11/2018 | Vollmer et al. |

FOREIGN PATENT DOCUMENTS

| | | | |
|---|---|---|---|
| CN | 102709676 | A | 10/2012 |
| CN | 202839949 | U | 3/2013 |
| CN | 203166098 | U | 8/2013 |
| CN | 203386887 | U | 1/2014 |
| CN | 103682678 | A | 3/2014 |
| CN | 103947041 | A | 7/2014 |
| CN | 104143699 | A | 11/2014 |
| CN | 105406188 | A | 3/2016 |
| CN | 105449361 | A | 3/2016 |
| CN | 105684217 | A | 6/2016 |
| CN | 103779658 | B | 8/2016 |
| CN | 105896071 | A | 8/2016 |
| EP | 3035438 | A1 | 6/2016 |
| EP | 3619770 | A1 | 3/2020 |
| JP | 2014039192 | A | 2/2014 |
| KR | 20050069746 | A | 7/2005 |
| KR | 20120130682 | A | 12/2012 |
| TW | 200701556 | A | 1/2007 |
| WO | 2016114990 | A1 | 7/2016 |
| WO | 2019009951 | A1 | 1/2019 |

* cited by examiner

RADIATOR ASSEMBLY FOR BASE STATION ANTENNA AND BASE STATION ANTENNA

CROSS-REFERENCE TO RELATED APPLICATION

The present application is a continuation of and claims priority to U.S. patent application Ser. No. 16/671,529, filed Nov. 1, 2019, which claims priority from and the benefit of Chinese Patent Application No. 201811500081.6, filed Dec. 10, 2018, the entire content of which is incorporated herein by reference in its entirety.

FIELD

The present invention relates to the field of communication, and more specifically, the present invention relates to a radiator assembly for a base station antenna and a base station antenna comprising the same.

BACKGROUND

A mobile communication network includes a large number of base stations. Each base station includes one or more base station antennas that receive and transmit communication signals. The base station antennas may include many radiator assemblies, which are also referred to as radiating elements or antenna elements. The cost of a single radiator assembly has a significant impact on the cost of the entire base station antenna. Miniaturization and cost reduction of the radiator assembly are desirable.

PCT patent application WO2016081036A1 discloses a base station antenna comprising a low frequency band radiator array and a high frequency band radiator array, where the individual dipole arms of each low frequency band radiator assembly are implemented on respective printed circuit boards.

SUMMARY

According to a first aspect of the present invention, a radiator assembly for a base station antenna is provided, wherein the radiator assembly comprises two dipoles arranged in a cross-over manner, each dipole including two dipole arms, and two feeding lines, each feeding line being associated with a respective one of the dipoles, where each dipole arm is integrally formed of a sheet metal, and includes a radiating surface and a leg projecting from the radiating surface at an angle with the radiating surface respectively, wherein the leg is electrically grounded. The dipole arms may be made by stamping a sheet metal, which is simple and inexpensive in terms of manufacturing technology, and the obtained dipole arms may be stable in shape.

In some embodiments, the radiator assembly may further comprise an arm holder configured to support the dipole arms and/or at least one feeding line holder configured to support at least one of the two feeding lines. Alternatively, it is also possible that each of the dipole arms is supported by a support element respectively or that every two dipole arms are supported by a common support element.

In some embodiments, the arm holder may include a foot, a central recess and four arm supports surrounding the central recess, wherein the foot is configured to secure the arm holder to a substrate or reflector of the base station antenna, the central recess is configured to receive the feeding line holder, and the arm supports are configured to support the dipole arms.

In some embodiments, the radiating surfaces of the dipole arms are mounted on respective ones of the arm supports. The single arm support may, for example, have a contour substantially identical to the radiating surface, and support the radiating surface in a planar manner. For example, the single arm support may be constructed in the shape of a grid or a rod.

In some embodiments, each arm support may be provided with a respective cover, where the radiating surfaces of the dipole arms are captured between the arm supports and the associated covers. The radiating surface may also be held on the arm support in other manners, for example by means of an interference fit, a screw connection, adhesion or the like.

In some embodiments, each arm support may be respectively snap-fittedly connected with an associated one of the covers.

In some embodiments, the arm holder may include a support structure for supporting the radiating surfaces of the dipole arms, where the support structure includes an outer ring, an inner ring, and ribs that connect the outer ring to the inner ring.

In some embodiments, the arm supports may respectively have a plurality of openings.

In some embodiments, the two feeding lines may be integrally formed of a sheet metal respectively, and the two feeding lines respectively include two legs and a limb connecting the two legs. Alternatively, the feeding lines may also be coaxial cables.

In some embodiments, the at least one feeding line holder may include a first feeding line holder, which holds the limbs of the two feeding lines, and make the limbs of the two feeding lines spaced apart from each other.

In some embodiments, the first feeding line holder may include a body having a first side surface and a second side surface opposite to the first side surface, and/or a first snap-fit element constructed on the first side surface and configured to form a snap-fit connection with the limb of one of the feeding lines, and/or a second snap-fit element configured on the second side surface and configured to form a snap-fit connection with the limb of the other of the feeding lines.

Detachable connection may be quickly established by a snap-fit element, while other connection manners may also be considered.

In some embodiments, the first feeding line holder may further include two through holes, which are configured to receive the two legs of the one of the feeding lines. As an alternative, it is also possible for the body of the first feeding line holder to have two open recesses on the circumference for receiving and guiding two legs of the one of the feeding lines.

In some embodiments, the first feeding line holder may further include at least one third snap-fit element projecting from its body, wherein the third snap-fit element is configured to form a snap-fit connection with the leg of the respective dipole arm.

In some embodiments, the at least one feeding line holder may include a second feeding line holder, which is configured to guide the respective legs of the two feeding lines.

In some embodiments, the second feeding line holder may include a body and four through holes formed in the body, where each through hole is configured to receive a respective one of the legs of one of the feeding lines. As an alternative, it is also possible for the body of the second feeding line holder to have four open recesses on the circumference for receiving and guiding one of the legs of one of the feeding lines respectively.

In some embodiments, the second feeding line holder may further include at least one snap-fit element projecting from its body, where the snap-fit element of the second feeding line holder is configured to form a snap-fit connection with the leg of the respective dipole arm.

In some embodiments, the radiating surfaces of the dipole arms may respectively have a central opening.

In some embodiments, the dipole arms respectively have at least one tab that extends at an angle with respect to the radiating surface, whereby the bandwidth of the radiator assembly may be extended. In some embodiments, the tab may extend at an angle of 80° to 100°, for example about 90°, with respect to the radiating surface. In some embodiments, the tab may have a contour in a rectangular shape, a triangular shape or any other shape.

In some embodiments, the legs of the dipole arms may extend at an angle of 80° to 100°, for example about 90°, with respect to the radiating surfaces of the respective dipole arms.

In some embodiments, the feeding lines are electrically connected with a feed circuit of a feeding plate constructed as a printed circuit board, or electrically connected with a phase cable for feeding.

In some embodiments, the legs of the dipole arms are electrically connected with a grounding layer of the feeding plate constructed as a printed circuit board, or contact a reflector so as to be grounded, or are capacitively coupled to the reflector so as to be grounded.

In some embodiments, the arm holder and the at least one feeding line holder are constructed as members that are separated from one another, or constructed as a one-piece component.

In some embodiments, each feeding line comprises a hook balun.

According to another aspect of the present invention, a base station antenna is provided, wherein the base station antenna comprises a radiator array, where the radiator array includes a plurality of radiator assemblies for a base station antenna according to the first aspect of the present invention.

In some embodiments, the radiator array is a low frequency band radiator array, and the base station antenna further includes a high frequency band radiator array. The base station antenna according to the present invention may in particular be constructed as a dual frequency band and bipolar base station antenna.

It is also to be noted here that, various technical features mentioned in the present application, even if they are recited in different paragraphs of the description or described in different embodiments, may be combined with one another randomly, as long as these combinations are technically feasible. All of these combinations are the technical contents recited in the present application

DETAILED DESCRIPTION

Figure 1:
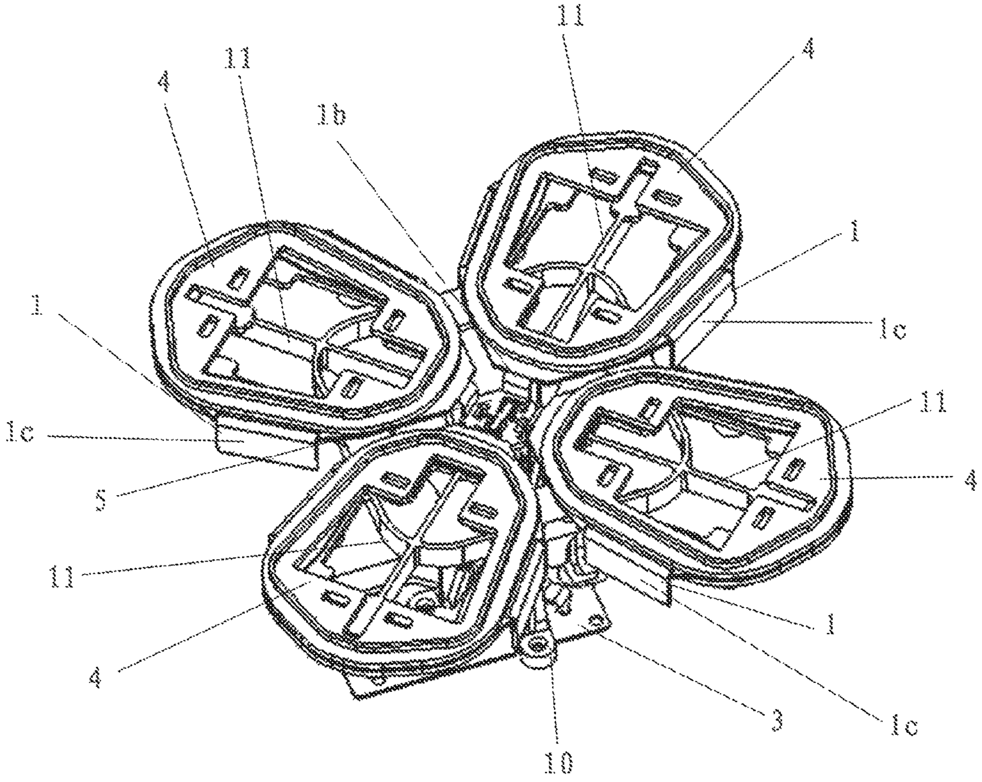
FIG. 1 is a perspective view of a radiator assembly according to an embodiment of the present invention.
Figure 2:
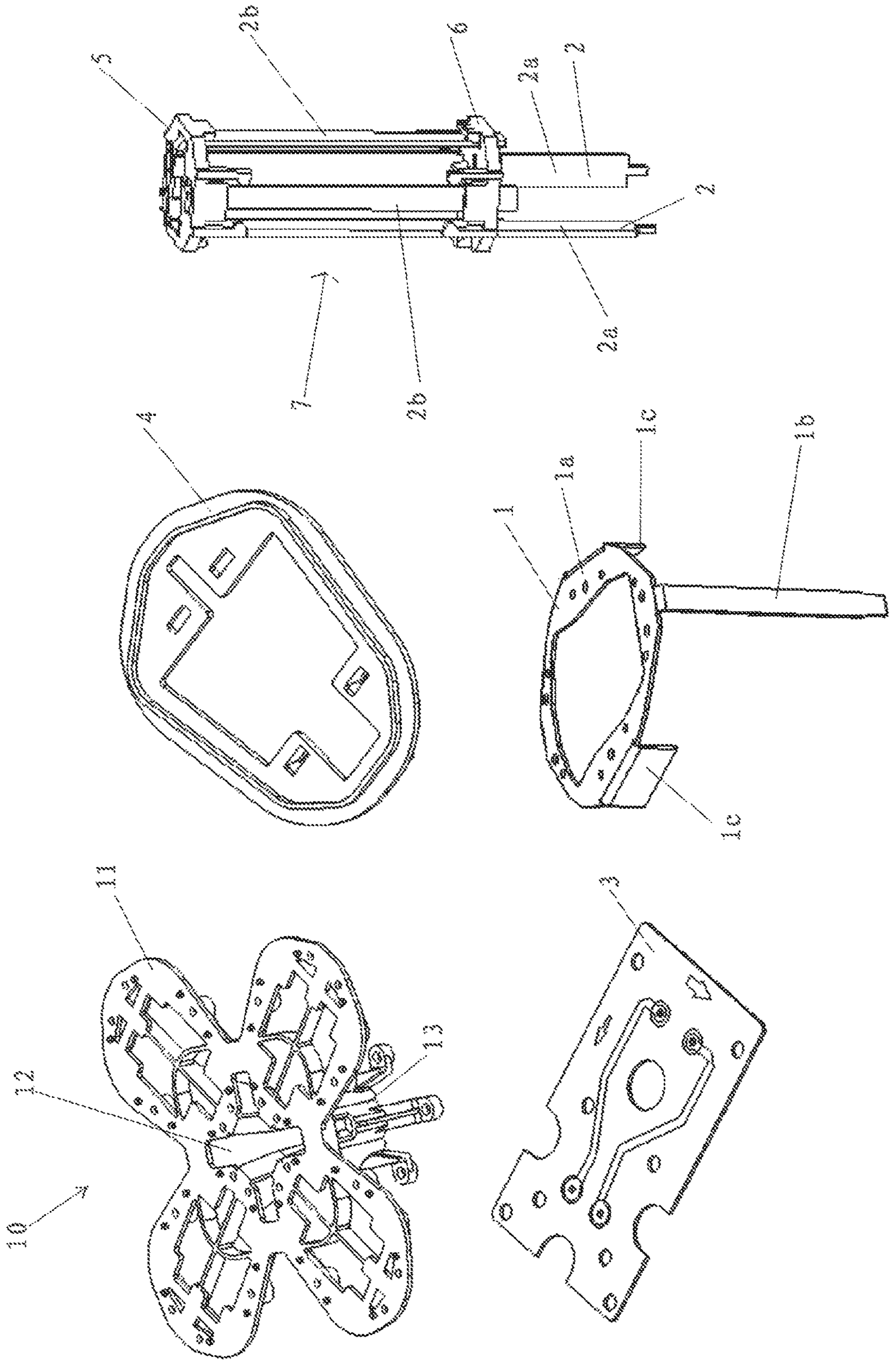
FIG. 2 is a series of perspective views of various of the constituent parts of the radiator assembly according to FIG. 1.
Figure 3:
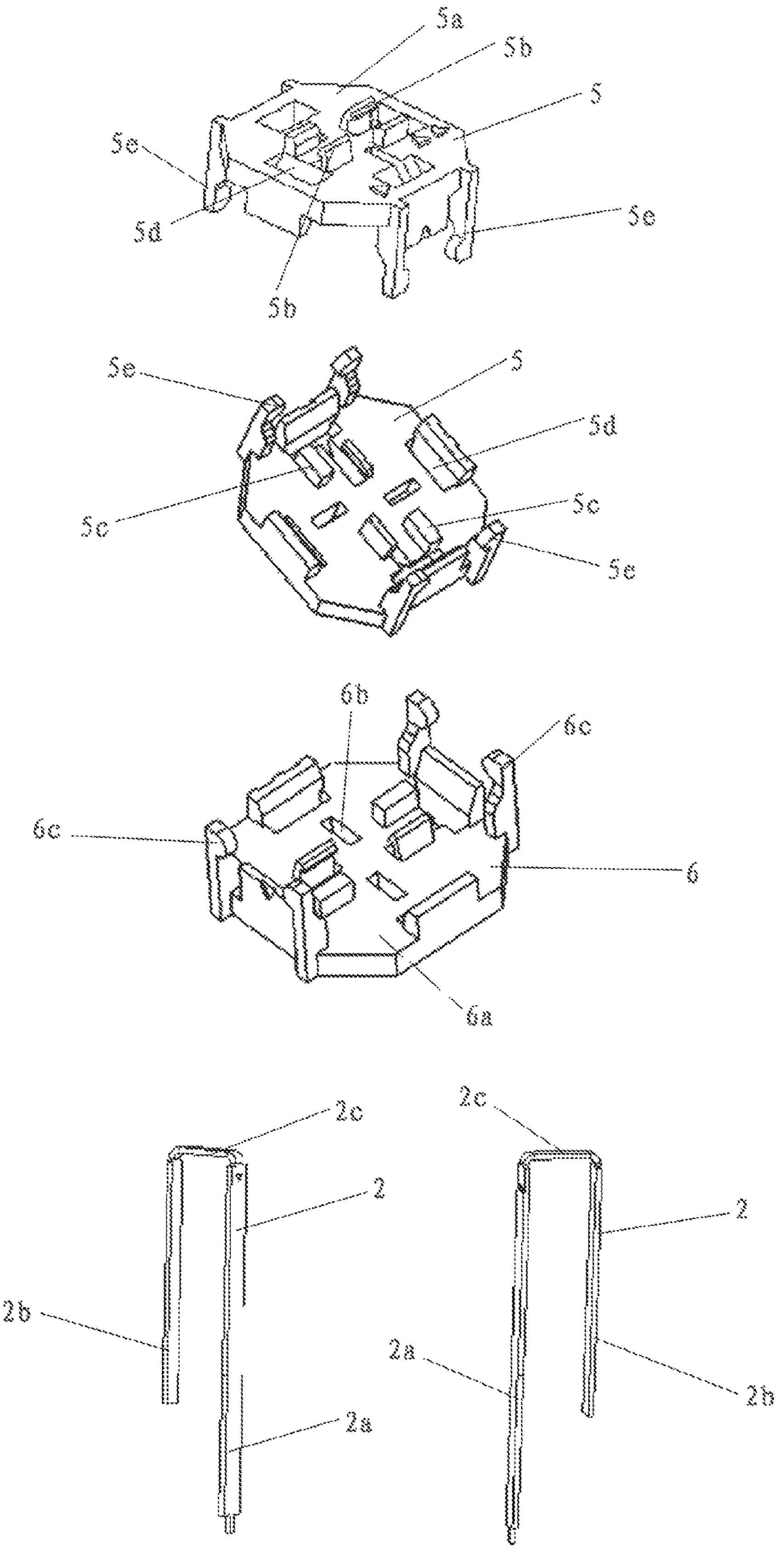
FIG. 3 is an exploded view of the feeding line arrangement of the radiator assembly of FIGS. 1 and 2.

FIG. 1 is a perspective view of a radiator assembly according to an embodiment of the present invention. FIG. 2 is a series of perspective views of various of the constituent parts of the radiator assembly, and FIG. 3 is an exploded view of the feeding line arrangement of the radiator assembly, wherein the first feeding line holder 5 is depicted in FIG. 3 from two different perspectives. The radiator assembly is suitable for use as a low frequency band radiator assembly, especially applicable for a frequency range of 694 to 960 MHz.

The radiator assembly may comprise an arm holder 10 which may support four dipole arms 1. For the sake of simplicity, only one of the dipole arms 1 is depicted in FIG. 2, and the other three dipole arms 1 may be constructed identically or similarly. Every two dipole arms 1 constitute a dipole, and two dipoles are arranged in a cross-over manner.

As can be seen in FIG. 2, the arm holder 10 includes a foot 13, a central recess 12 and four arm supports 11 that surround the central recess 12. The foot 13 may be configured to secure the arm holder 10 to another element of the base station antenna. For example, the foot 13 may be used to secure the arm holder 10 onto a substrate or a reflector plate by screws. The central recess 12 may be configured to receive the feeding line arrangement 7. Each arm support 11 may be configured to support a respective one of the dipole arms 1. The arm holder 10 may be made of a non-conductive material, for example plastic.

Each dipole arms 1 may be integrally formed from sheet metal, for example, formed by stamping, and a single dipole arm 1 includes a radiating surface 1*a* and a leg 1*b* projecting rearwardly from the radiating surface at an angle with the radiating surface and especially substantially perpendicular to the radiating surface. The leg 1*b* is electrically grounded. For example, the leg 1*b* may contact a grounding layer of a feeding plate 3 or a reflector plate, or may be capacitively coupled with the grounding layer of the feeding plate 3 or the reflector plate so as to realize the grounding. For example, the dipole arm 1 may have a tin plating layer in its entirety or only in the region of its leg 1*b* in order to be welded with the grounding layer of the feeding plate. Alternatively, it is also possible that the end of the leg 1*b* is provided with a PEM stud with a tin plating layer, so that it is not necessary to apply a tin plating layer to the dipole arm 1. The feeding plate 3 may be constructed as a printed circuit board and may or may not be a constituent part of the radiator assembly. Alternatively, the feeding may also be realized by coaxial cables or other radio frequency transmission line structures.

Each dipole arm 1 may be inserted into the central recess 12 so that their legs 1*b*, for example, may rest against the inner wall of the central recess 12. The radiating surfaces 1*a* of the dipole arms 1 may be supported on the respective arm supports 11 of the arm holder 10. The arm supports 11 may have a contour substantially identical to the respective radiating surface 1*a* in some embodiments. In an example embodiment, each radiating surface 1*a* may have a snap-fit element for establishing a snap-fit connection with a respective one of the arm supports 11. In other embodiments, each radiating surface 1*a* may be fastened onto a respective one of the arm supports 11 by screws or using adhesives. In the embodiments shown in FIGS. 1 and 2, each dipole arm 1 is provided with a cover 4, such that the radiating surface 1*a* of the dipole arm 1 is clamped between the arm support 11 and the cover 4, where the cover 4 may be detachably connected, for example snap-fittedly connected or non-detachably connected to its corresponding arm support 11. The four covers 4 may be implemented as four separate structures or as a single cover in example embodiments.

The radiating surface 1*a* of each dipole arm 1 may be constructed to be substantially free of openings. Alternatively, the radiating surface 1*a* may also have one or more openings in order to, for example, reduce material costs and weight. In the embodiment shown in FIG. 2, the radiating surface 1*a* has a central opening, and the radiating surface 1*a* is constructed to be substantially annular.

As shown in FIG. 2, the dipole arm 1 has two rearwardly-extending tabs 1*c* which extend substantially perpendicularly with respect to the radiating surface 1*a*, and which have a rectangular contour. The tabs 1*c* may increase the operating bandwidth of the radiator assembly. The tabs 1*c* may also have other contour shapes, for example may have a substantially triangular contour. The number of tabs 1*c* may also be one, three or more in other embodiments. The angle that the tab 1*c* forms with respect to the radiating surface 1*a* may be, for example, between 60° and 120°, preferably between 70° and 110°, in particular between 80° and 100°.

The central recess 12 receives a feeding line arrangement 7, which may include two substantially U-shaped feeding lines 2 formed from sheet metal, for example by stamping, and each of the feeding lines 2 respectively includes two legs 2*a*, 2*b* and a limb 2*c* connecting the two legs 2*a*, 2*b*. Each U-shaped feeding line 2 may form a hook balun that passes radio frequency signals to and from the two dipole arms 1 of a respective one of the dipoles of the radiator assembly.

The feeding line arrangement 7 may include a first feeding line holder 5, which holds the limbs 2*c* of the two feeding lines 2 in a spaced-apart relationship. As shown in FIG. 3, the first feeding line holder 5 may include a body 5*a* having a first (front) side surface, and a second (rear) side that is opposite the first side surface. Two pairs of snap-fit elements 5*b* are provided on the first side surface, and a through hole 5*d* is provided beside each respective pair of snap-fit elements 5*b*. The legs 2*a*, 2*b* of one of the two feeding lines 2 passes through the two through holes 5*d* and is snap-fitttedly connected with the two pairs of snap-fit elements 5*b* by its limb 2*c*. Two pairs of snap-fit elements 5*c* are provided on the second side surface, and the other feeding line of the two feeding lines 2 is snap-fittedly connected with the two pairs of snap-fit elements 5*c* by its limb 2*c*. The snap-fit elements 5*b* and the snap-fit elements 5*c* are arranged in a cross-over manner, particularly arranged substantially perpendicularly to one another.

As shown in FIG. 3, the first feeding line holder 5 may include two pairs of third snap-fit elements 5*e* that project rearwardly from its body 5*a*, where each pair of third snap-fit elements is configured to form a snap-fit connection with the leg 1*b* of a corresponding dipole arm 1. This configuration makes it possible to easily realize predetermined stable relative positions of the legs 2*a*, 2*b* of the feeding line 2 with respect to the legs 1*b* of the respective dipole arms 1.

The feeding line arrangement 7 may include a second feeding line holder 6, which may include a body 6*a* and four through holes 6*b* that are formed through the body 6*a*, where each through hole 6*b* is configured for passage of one of the legs 2*a*, 2*b* of the feeding lines 2, so that it is possible to favorably maintain predetermined stable relative positions between the two feeding lines 2 and between their legs 2*a*, 2*b*. The second feeding line holder 6 may include two pairs of snap-fit elements 6*c* projecting from its body 6*a*, wherein each pair of snap-fit elements 6*c* is configured to form a snap-fit connection with the leg 1*b* of one corresponding dipole arms 1, Thus, it is possible to easily realize predetermined stable relative positions of the legs 2*a*, 2*b* of the feeding line 2 and the leg 1*b* of the respective dipole arm 1.

In the embodiment shown in FIGS. 2 and 3, the feeding line arrangement 7 includes two feeding line holders 5, 6. It is also possible to provide only one single feeding line holder, or it is also possible to provide three or more feeding line holders. In the case of a single feeding line holder, it may be particularly advantageous for the feeding line holder to have holding elements for holding the respective legs 2*a*, 2*b* of the two feeding lines 2 and holding elements for holding the legs 1*b* of the dipole arms 1. The feeding line holder may be made of a non-conductive material, for example plastic.

In the embodiment shown in FIGS. 2 and 3, the arm holder 10 and the two feeding line holders 5, 6 are respectively constructed as separate members. Alternatively, the arm holder 10 and the two feeding line holders 5, 6 may be constructed as one piece, for example integrally made by injection molding. It is also possible that the arm holder 10 and one of the feeding line holders (for example the second feeding line holder 6) are constructed as one piece, while the other of the feeding line holders (for example the first feeding line holder 5) is constructed as a separate member.

Figure 4A:
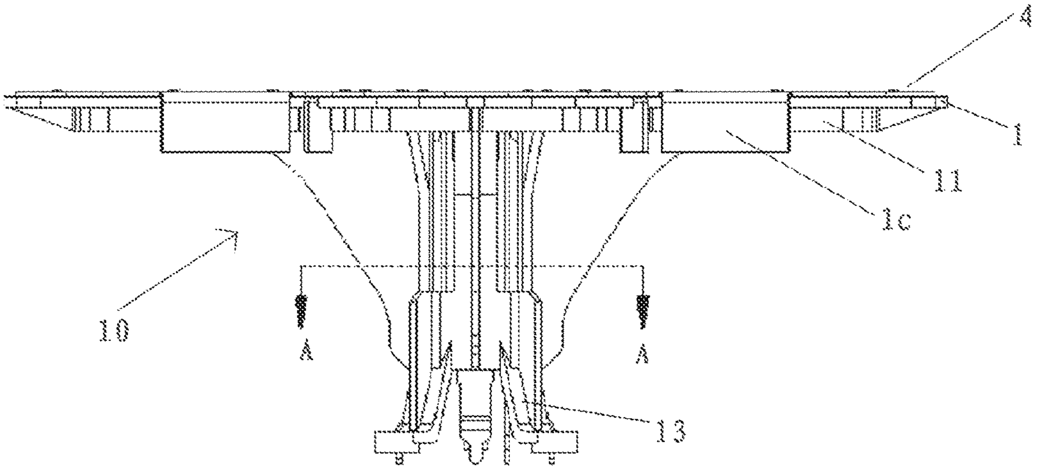
FIG. 4*a* is a side view of the radiator assembly of FIGS. 1-3.
Figure 4B:
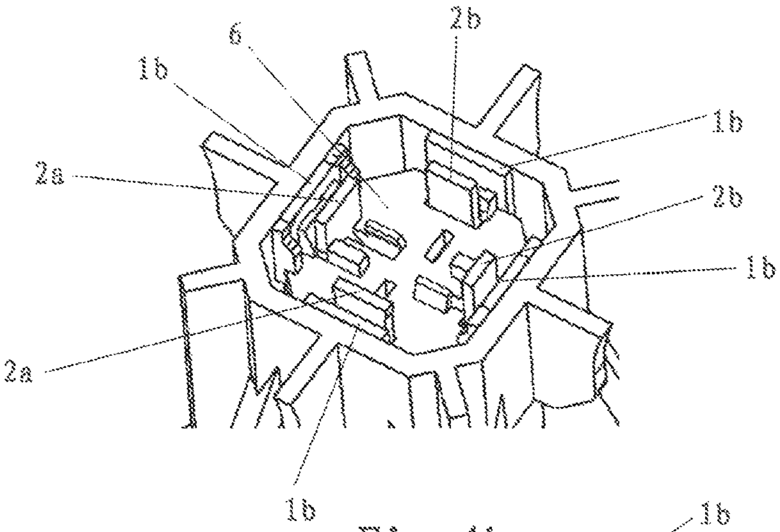
FIG. 4*b* is a partial perspective view of the radiator assembly cut away along the section line A-A of FIG. 4*a*.
Figure 4C:
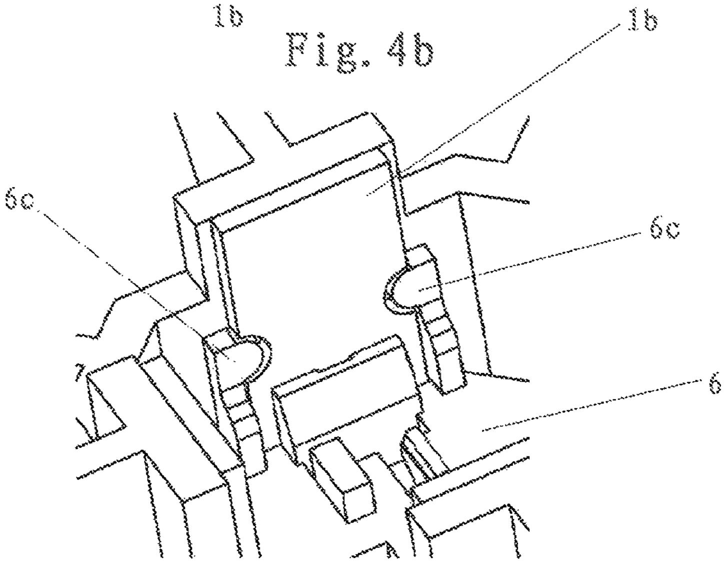
FIG. 4*c* is a partial enlarged bottom perspective view of the radiator assembly of FIGS. 1-3.

FIG. 4*a* is a side view of the radiator assembly according to FIGS. 1-3, FIG. 4*b* is a partial perspective view of the radiator assembly cut away along the section line A-A of FIG. 4*a*, and FIG. 4*c* is a partial enlarged bottom view of the radiator assembly.

In FIG. 4*b*, it can be seen that the second feeding line holder 6 is placed in the central recess 12 of the arm holder 10. The legs 1*b* of the four dipole arms 1 each rest against the inner wall of the central recess 12, and the two legs 2*a*, 2*b* of each feeding line 2 are opposite to and spaced apart from one of the two legs 1*b* of the two dipole arms 1 of one dipole respectively. FIG. 4*c* shows a pair of snap-fit elements 6*c* of the second feeding line holder 6 and a pair of counterpart snap-fit elements of the leg 1*b* constructed as recesses, thereby a snap-fit connection between the second feeding line holder 6 and the leg 1*b* can be established, so that the feeding line 2 and the corresponding dipole arm 1 are situated in predetermined stable relative position.

Figure 5:
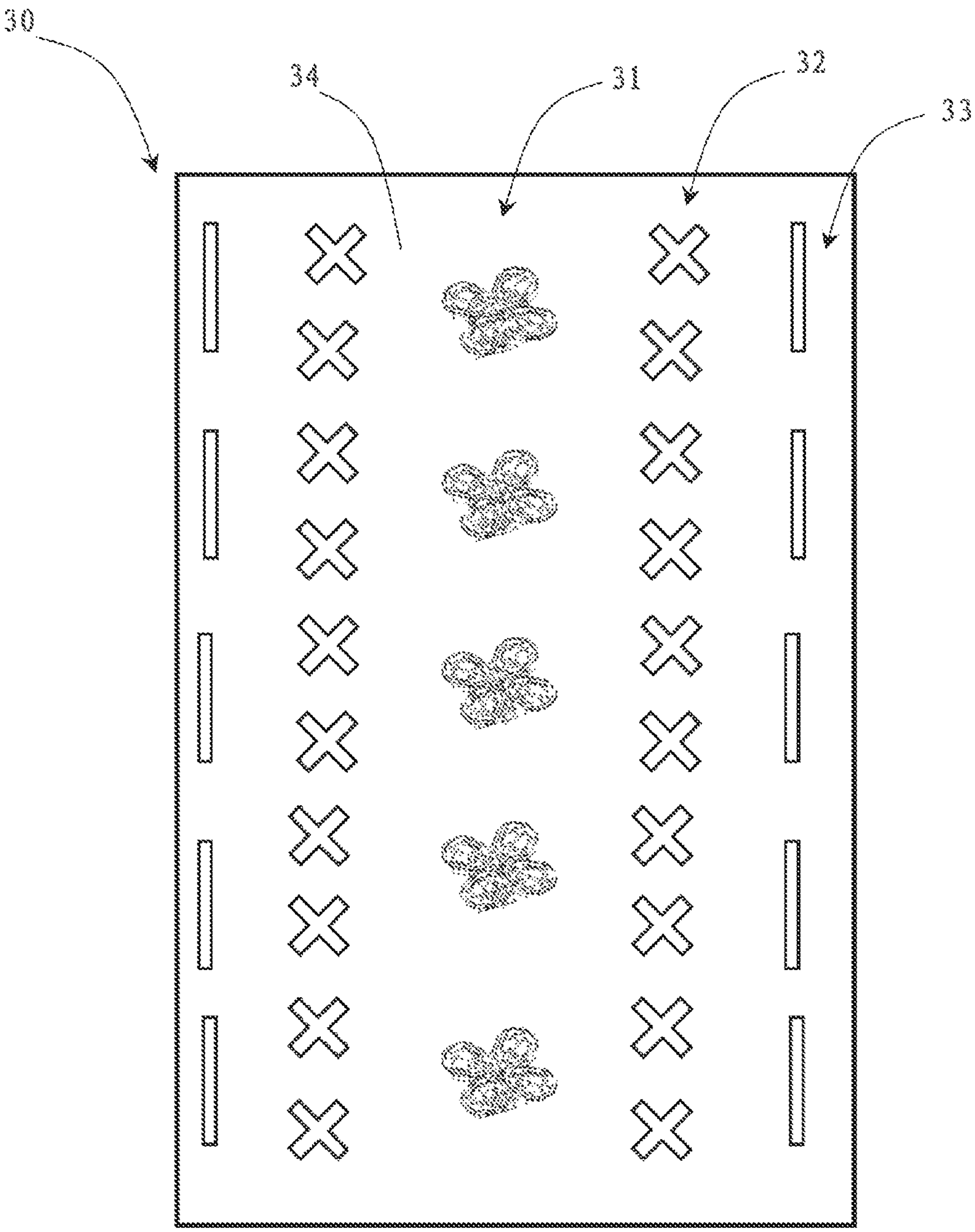
FIG. 5 is a schematic front view of a base station antenna according to an embodiment of the present invention.

FIG. 5 is a schematic front view of a base station antenna 30 according to an embodiment of the present invention, which is constructed as a dual frequency band base station antenna comprising a substrate or reflector 34, a low frequency band radiator array 31 and a pair of high frequency band radiator arrays 32 placed on the substrate, as well as parasitic element arrays 33. The low frequency band radiator array 31 may include a plurality of radiator assemblies according to the present invention. The low frequency band array 31 may be arranged between the two high frequency band radiator arrays 32. Each high frequency band radiator array 32 may include a plurality of high frequency band radiator assemblies known from the prior art. Each parasitic unit array 33 may include a plurality of parasitic elements known from the prior art. Here, the low frequency band especially refers to the frequency range of 694 to 960 MHz, and the high frequency band especially refers to the frequency range of 1695 to 2690 MHz, although embodiments of the present invention are not limited thereto. When two different frequency bands are concerned, the one may be referred as low frequency band, and the other may be referred as high frequency band.

In other embodiments, the base station antenna 30 may be a single frequency band, for example, including only the low frequency band radiator array 31, or may also include more than two frequency bands. In FIG. 5, the number and arrangement of the low frequency band radiator assemblies, the number and arrangement of the high frequency band radiator assemblies, and the number and arrangement of the parasitic elements are all exemplary.

Figure 6:
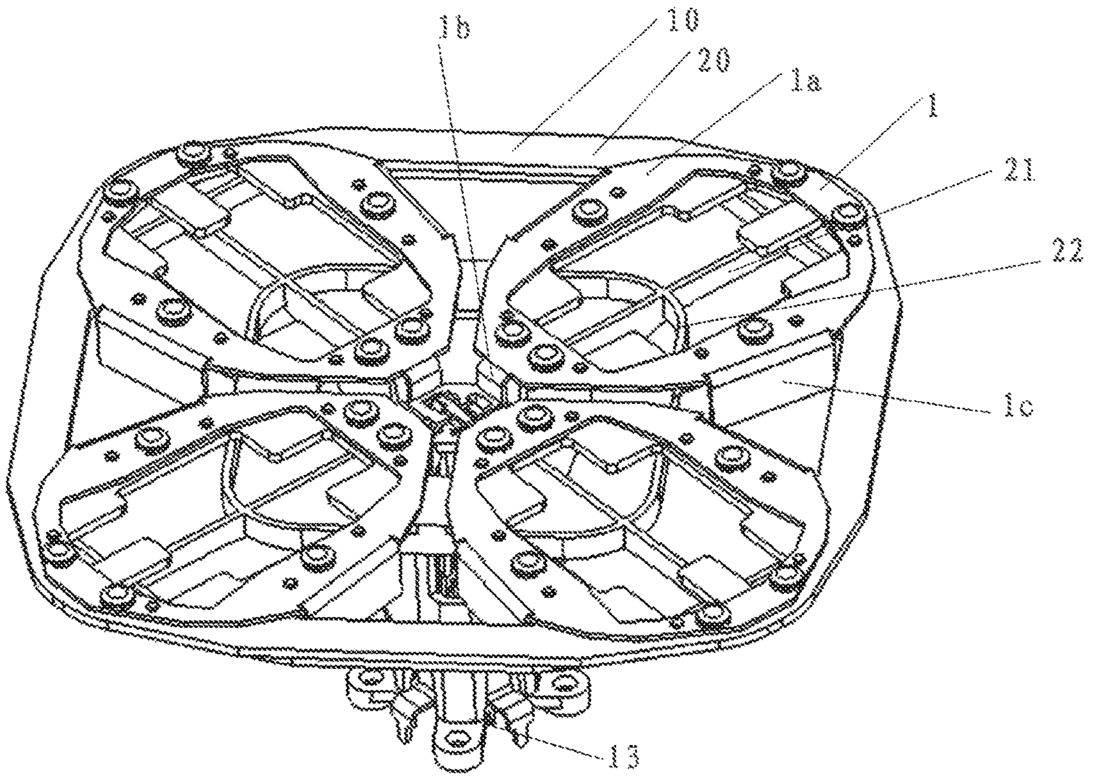
FIGS. 6 and 7 are perspective views of radiator assemblies according to further embodiments of the present invention.

FIG. 6 is a perspective view of a radiator assembly according to another embodiment of the present invention. Here, the dipole arms 1, the feeding lines 2 and the feeding line holders 5, 6 may be constructed identically or similarly to the embodiment according to FIG. 1. The difference from the embodiment according to FIG. 1 lies primarily in the construction of the arm holder 10. In the embodiment according to FIG. 6, the arm holder 10 includes a grid structure for supporting the radiating surfaces 1*a* of the dipole arms 1, where the grid structure includes an outer ring 20, an inner ring 22 and generally radially extending ribs 21 connecting the inner ring 22 and the outer ring 20 to each other. The radiating surfaces 1*a* of the dipole arms 1 are supported and fixed on the outer ring 20 and the inner ring 22. Compared to the embodiment according to FIG. 1, the arm holder 10 according to FIG. 6 has a reduced weight. In addition, the effect of the arm holder 10 on the adjacent high frequency band radiator assemblies may be reduced, especially when the high frequency band radiator assemblies are mounted below the radiator assembly according to the present invention.

Figure 7:
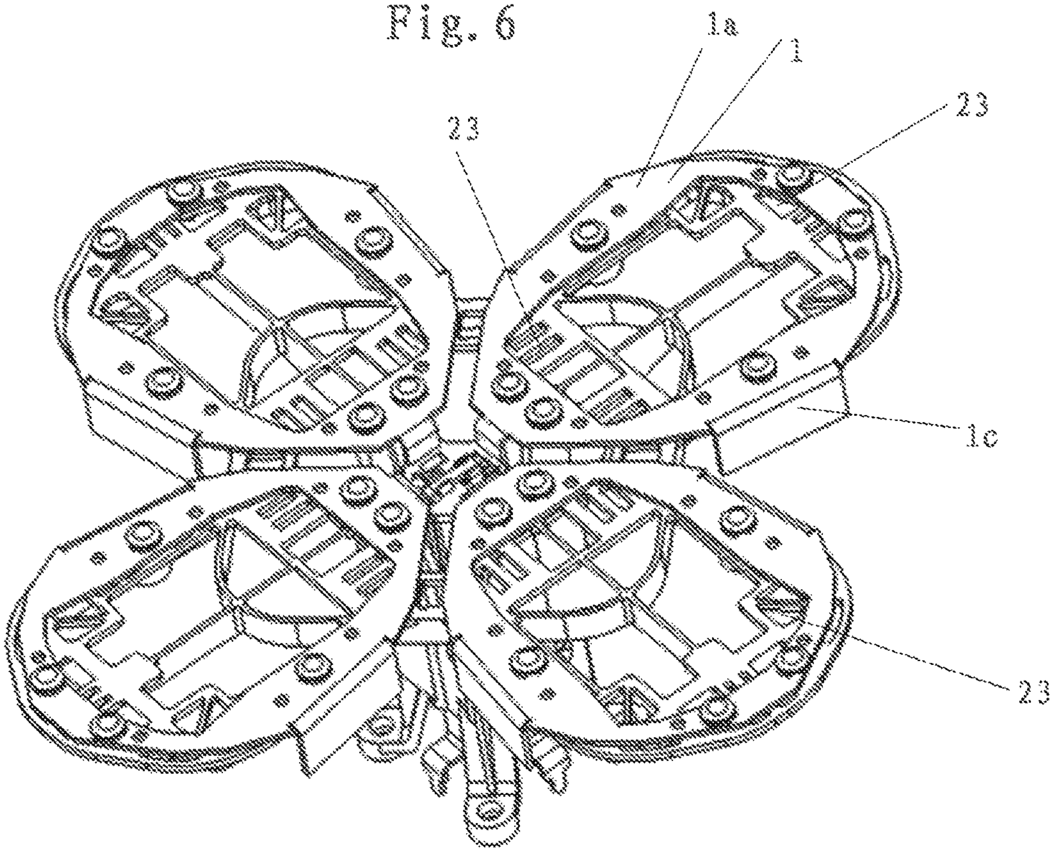
Figure 8:
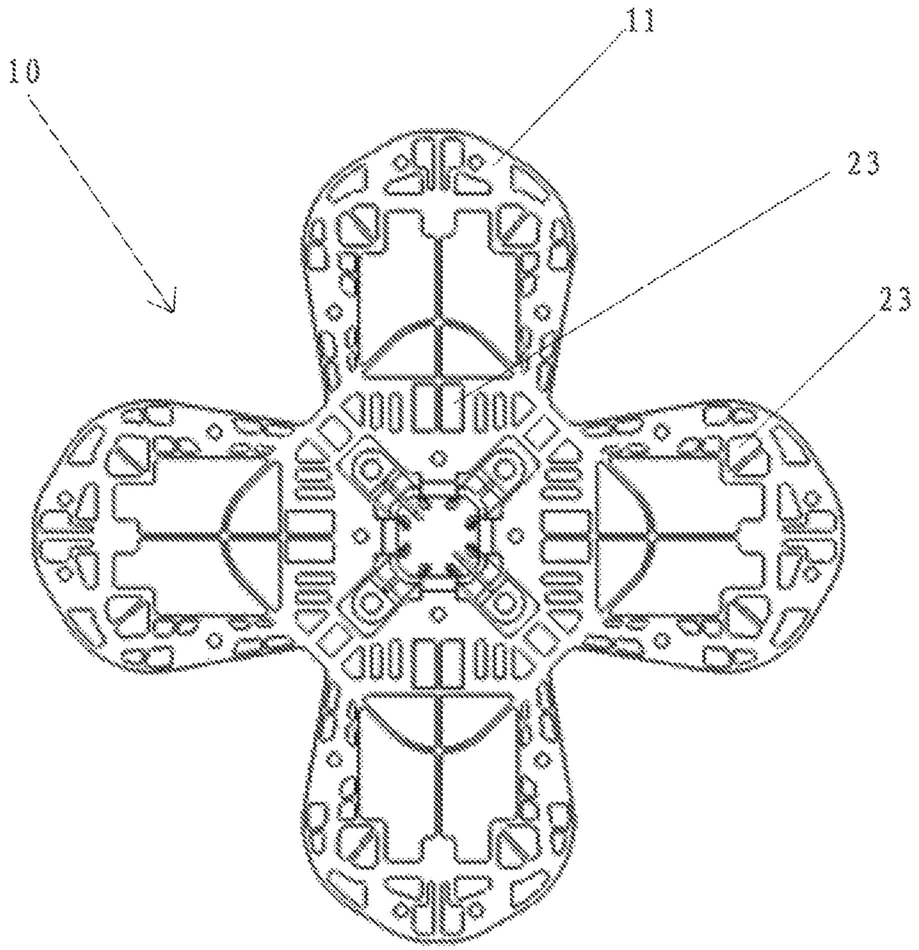
FIG. 8 is a front view of an arm holder of the radiator assembly of FIG. 7.

FIG. 7 is a perspective view of a radiator assembly according to another embodiment of the present invention, and FIG. 8 is a top view of an arm holder 10 of the radiator assembly according to FIG. 7. Here, the dipole arms 1, the feeding lines 2 and the feeding line holders 5, 6 may be constructed identically or similarly to the embodiment according to FIG. 1. The difference from the embodiment according to FIG. 1 lies primarily in the construction of the arm holder 10. The arm holder 10 according to FIG. 7 includes many openings 23. Compared to the embodiment according to FIG. 1, the arm holder 10 according to FIG. 7 has a reduced weight. In addition, the effect of the arm holder 10 on the adjacent high frequency band radiator assemblies may be reduced, especially when the high frequency band radiator assemblies are mounted below the radiator assembly according to the present invention.

The radiator assemblies according to FIGS. 6 to 8, in particular the low frequency band radiator assemblies, may be applied in the base station antenna as shown in FIG. 5.

Figure 9:
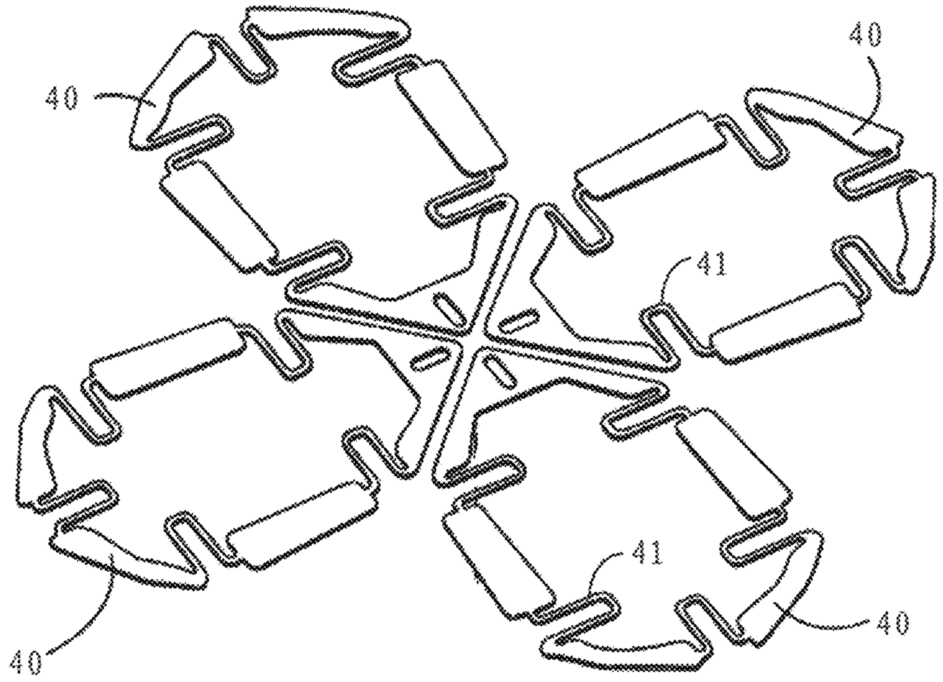
FIG. 9 is a perspective view of the radiating surfaces of four dipole arms according to an embodiment of the present invention.

It will also be appreciated that the radiating surface 1*a* of each dipole arm may be varied from what is shown in the above embodiments. For example, each radiating surface 1*a* may be formed as first and second spaced-apart conductive segments that together form a generally oval shape or a generally elongated rectangular shape. Distal ends of the first and second conductive segments of each dipole arm may be electrically connected to each other so that each dipole arm each has a closed loop structure. Each of the first and second conductive segments may include a plurality of widened sections and narrowed meandered conductive trace sections that connect adjacent ones of the widened sections. The narrowed meandered conductive trace sections may create a high impedance for currents that are, for example, at frequencies that are approximately twice the highest frequency in the operating frequency range of the low frequency band radiator assembly. The narrowed meandered conductive trace sections may make the low frequency band radiator assemblies according to embodiments of the present invention substantially transparent to radio frequency energy in the high frequency band. As a result, the low frequency band radiator assemblies may have little or no impact on the high frequency band radiator assemblies. FIG. 9 illustrates the radiating surfaces 1*a* of four dipole arms 1 that are each implemented as widened sections 40 that are coupled together by narrowed meandered conductive trace sections 41. The remaining components of the radiator assembly are omitted and the legs 1*b* of the dipole arms are not shown in FIG. 9.

Finally, it is to be noted that, the above-described embodiments are merely for understanding the present invention but do not limit the scope of the present invention. For those skilled in the art, amendments may be made on the basis of the above-described embodiments, and these amendments do not depart from the protection scope of the present invention.

That which is claimed is:

1. A base station antenna, comprising:
- a substrate;
- a low frequency band radiator array mounted on the substrate; and
- a pair of high frequency band radiator arrays mounted on the substrate,
- wherein the low frequency band radiator array includes a plurality of radiator assemblies, each radiator assembly comprising:
  - two dipoles arranged in a cross-over manner, each dipole including two dipole arms;
  - two feeding lines, each feeding line being associated with a respective one of the dipoles;
  - an arm holder comprising four arm supports extending outwardly therefrom, each arm support configured to support a radiating surface of a respective dipole arm thereon; and
  - at least one feeding line holder configured to support at least one of the two feeding lines.

2. The base station antenna of claim 1, wherein the arm holder of the radiator assembly includes a plurality of openings.

3. The base station antenna of claim 1, wherein the support structure of the arm holder is a grid structure.

4. The base station antenna of claim 1, wherein the support structure of the arm holder includes an outer ring, an inner ring, and generally radiating extending ribs connecting the inner ring and the outer ring.

5. The base station antenna of claim 4, wherein the radiating surfaces of the dipole arms of the radiator assembly are supported and fixed on the outer and inner rings.

6. The base station antenna of claim 1, wherein each radiating surface of the dipole arms of the radiator assembly is formed as a first conductive segment spaced-apart from a second conductive segment, the distal ends of the first and second conductive segments of each dipole arm being electrically connected to each other such that each dipole arm has a closed loop structure.

7. The base station antenna of claim 6, wherein each of the first and second conductive segments include a plurality of widened sections and narrowed meandered conductive trace sections that connect adjacent widened sections.

8. The base station antenna of claim 7, wherein the radiating surfaces of the dipole arms are each implemented as widened sections coupled together via narrowed meandered conductive trace sections.

9. The base station antenna of claim 1, further comprising a plurality of parasitic unit arrays mounted on the substrate.

10. The base station antenna of claim 1, wherein the low frequency band radiator array is arranged between the two high frequency band radiator arrays.

11. A base station antenna assembly, the base station antenna assembly comprising:

a base station antenna comprising a substrate; and a plurality of radiator assemblies mounted on the substrate, each radiator assembly comprising:

two dipoles arranged in a cross-over manner, each dipole including two dipole arms having respective radiating surfaces and a leg protecting from each of the respective radiating surfaces;

two feeding lines, each feeding line being associated with a respective one of the dipoles;

an arm holder including a central recess and a support structure for supporting the dipole arms; and at least one feeding line holder configured to engage with the two feeding lines and the leg of each dipole, wherein the central recess of the arm holder is configured to receive the at least one feeding line holder.

12. The base station antenna assembly of claim 11, further comprising a pair of high frequency band radiator arrays mounted on the substrate.

13. The base station antenna of claim 11, further comprising a plurality of parasitic unit arrays mounted on the substrate.

14. A base station antenna, comprising:

a substrate;

a low frequency band radiator array mounted on the substrate; and a pair of high frequency band radiator arrays mounted on the substrate, wherein the low frequency band radiator array includes a plurality of radiator assemblies, each radiator assembly comprising:

two dipoles arranged in a cross-over manner, each dipole including two dipole arms;

two feeding lines, each feeding line being associated with a respective one of the dipoles; and at least one feeding line holder configured to support at least one of the two feeding lines, each feeding line respectively includes two legs and a limb connecting the two legs, wherein each dipole arm includes a radiating surface and a leg projecting from the radiating surface, and wherein the leg is electrically grounded, and wherein the at least one feeding line holder comprises:

a body having a first side surface and a second side surface opposite to the first side surface;

a first snap-fit element constructed on the first side surface and configured to form a snap-fit connection with the limb of one of the feeding lines; and a second snap-fit element configured on the second side surface and configured to form a snap-fit connection with the limb of the other of the feeding lines.

15. The base station antenna of claim 14, wherein each dipole arm of each radiator assembly is integrally formed of a sheet metal.

16. The base station antenna of claim 14, wherein each radiator assembly further comprises an arm holder configured to support the dipole arms.

17. The base station antenna of claim 16, wherein the arm holder includes a foot, a central recess and four arm supports surrounding the central recess, wherein the foot is configured to secure the arm holder to a substrate or reflector of the base station antenna, the central recess is configured to receive the at least one feeding line holder and the leg of each dipole arm, and the arm supports are configured to support the dipole arms.

18. The base station antenna of claim 14, wherein the two feeding lines are integrally formed of sheet metal.

19. The base station antenna of claim 14, wherein the first feeding line holder further includes two through holes, which are configured to receive the two legs of the one of the feeding lines.

20. The base station antenna of claim 14, wherein the first feeding line holder further includes at least one third snap-fit element projecting from its body, and wherein the third snap-fit element is configured to form a snap-fit connection with the leg of the respective dipole arm.

* * * * *